US007082576B2

(12) United States Patent
Shahine et al.

(10) Patent No.: US 7,082,576 B2
(45) Date of Patent: Jul. 25, 2006

(54) SYSTEM AND PROCESS FOR DYNAMICALLY DISPLAYING PRIORITIZED DATA OBJECTS

(75) Inventors: Omar H. Shahine, Palo Alto, CA (US); Michael W. Fullerton, San Jose, CA (US); Han-Yi Shaw, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 09/755,769

(22) Filed: Jan. 4, 2001

(65) Prior Publication Data
US 2004/0070627 A1 Apr. 15, 2004

(51) Int. Cl.
G06F 3/00 (2006.01)
G06F 17/24 (2006.01)
(52) U.S. Cl. ...................... 715/789; 715/520
(58) Field of Classification Search .............. 709/249; 345/379, 455, 733, 738; 715/500–542, 789
See application file for complete search history.

(56) References Cited

U.S. PATENT DOCUMENTS 5,793,365 A * 8/1998 Tang et al. .................. 345/758
5,838,783 A * 11/1998 Cheng et al. .......... 379/355.05
5,923,327 A * 7/1999 Smith et al. ................. 345/784
5,956,738 A * 9/1999 Shirakawa .................. 715/517
6,014,135 A * 1/2000 Fernandes .................. 345/744
6,125,287 A * 9/2000 Cushman et al. ........... 455/566
6,366,302 B1* 4/2002 Crosby et al. .............. 345/786
6,496,201 B1* 12/2002 Baldwin et al. ............ 345/753

OTHER PUBLICATIONS

Screen Dumps of Microsoft Windows Version 4.0 (pp. 1-8, 1998).*

* cited by examiner

Primary Examiner—Steven Sax
Assistant Examiner—Lê Nguyen
(74) Attorney, Agent, or Firm—Lyon & Harr, LLP; Mark A. Watson

(57) ABSTRACT

The present invention involves a new system and process for dynamically displaying data objects or "information" on a computer display device based on a predefined priority associated with each individual element of the information. Consequently, more important information is displayed prior to less important information. The information may be either entered by a user, or automatically retrieved from one or more electronic data sources. For example, a large amount of different information is typically entered either automatically or by a user to fully describe a subject, such as, for example, a personal contact in an address book. Frequently, however, not all of the information to describe the contact is available. Further, the information that is available is typically more than can be easily displayed within a single concise window. Consequently, the present invention is used to display a summary of available information based on a predefined priority associated with each portion or element of that information.

57 Claims, 7 Drawing Sheets

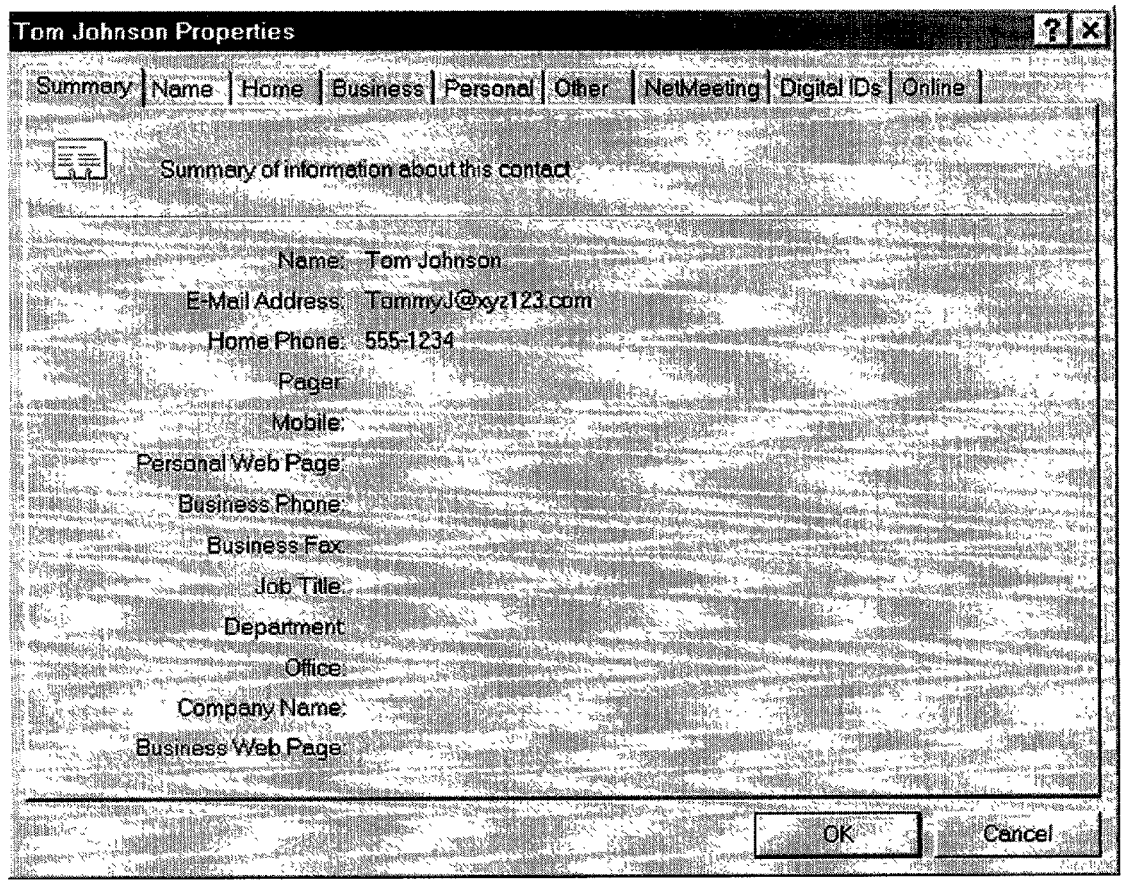
FIG. 1 - PRIOR ART

Card for Tommy Johnson

Location: Personal Address Book

| Name | Contact | Notes | Conferencing |

First Name: Tom

Last Name: Johnson

Display Name: Tom Johnson

Email: TommyJ@xyz123.com

Nickname:

☐ Prefers to receive rich text (HTML) mail

Work:

Home: 555-1234

Fax:

Pager:

Cellular:

[ OK ]  [ Cancel ]  [ Help ]

FIG. 2 - PRIOR ART

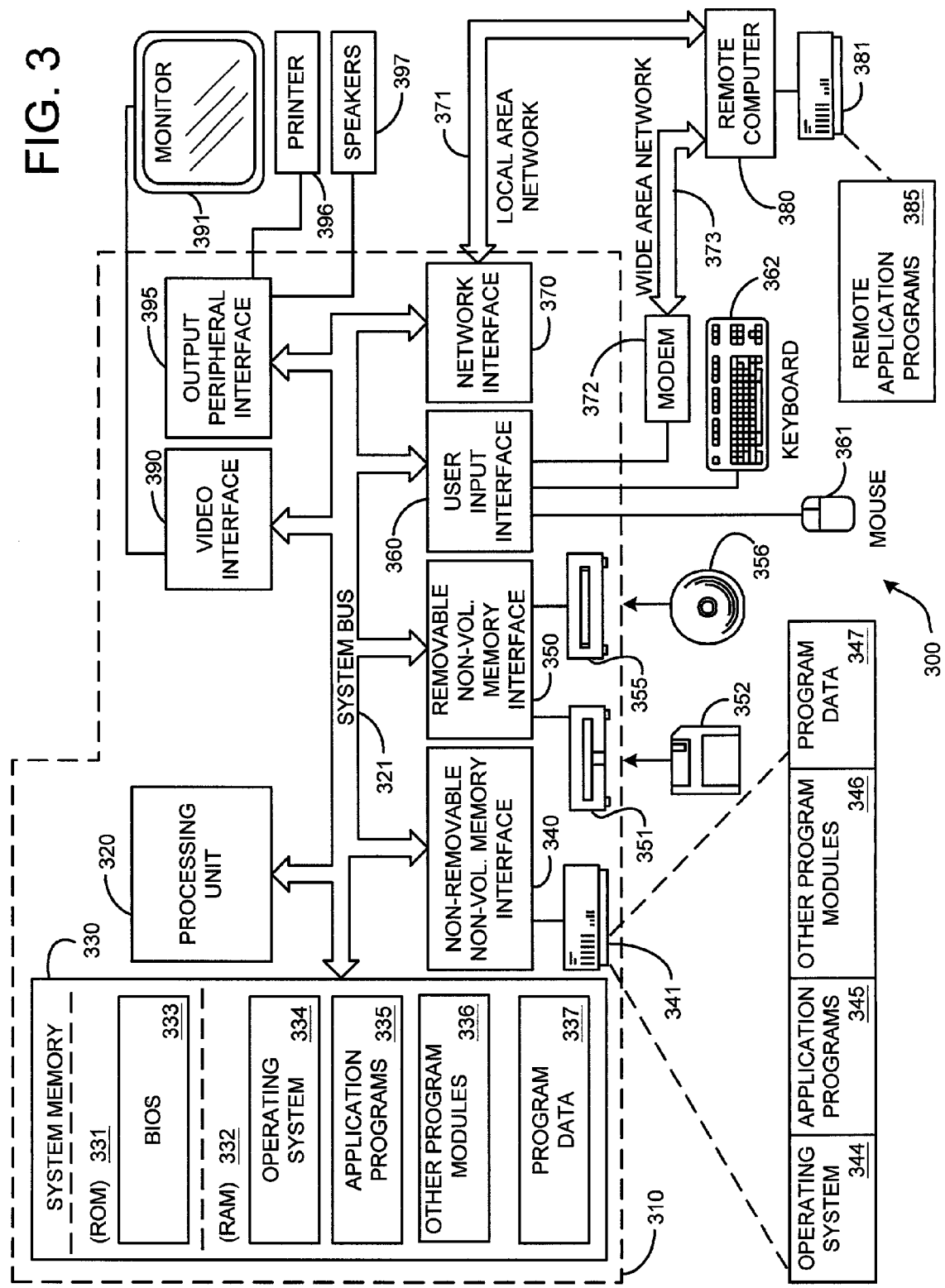

SYSTEM AND PROCESS FOR DYNAMICALLY DISPLAYING PRIORITIZED DATA OBJECTS

BACKGROUND

1. Technical Field

The invention is related to a system and process for dynamically arranging and displaying data objects or "information" on a display device based on priorities associated with each individual element of the information.

2. Related Art

By way of background, schemes for displaying data or information, either entered by a user or retrieved from a database or other electronic data source, typically use a predefined placement or arrangement of the information within a window on a computer display device. Consequently, where specific elements of the data are not available, the display device typically includes blank areas corresponding to the predefined placement for that missing data. Further, many of the available data elements may be used for information that has little or no importance to a given user, and thus, even if the user had the information available, it is unlikely that he or she would take the time to enter such data, or to use it if it was retrieved from a database or other electronic data source. In addition, data labels associated with each data element are also typically displayed in predefined positions whether or not the data associated with those labels is available. Thus, in such situations, valuable display space is simply wasted by displaying unimportant information or by displaying data labels associated with unavailable information. Consequently, a display device implementing such schemes tends to appear overly cluttered and complicated, while including blank areas that may be aesthetically unpleasant to a user or viewer of the display device.

For example, as Illustrated by FIG. 1, one prior art electronic address book allows users to view properties for each contact in the address book. The property display for a given contact includes a "Summary" page of predefined information for the contact, and has data labels or headers, such as, for example, name, e-mail address, home phone number, pager number, mobile phone number, web page address, etc. Often, users fail to populate the information for contacts in address book, because it can be time consuming, because it is not important, or because they simply do not have the information available to complete each of the myriad fields. However, as illustrated by FIG. 1, headers for information that is not available are still shown. Consequently, while the "Summary" page illustrated by FIG. 1 may be substantially blank, it still appears overly complicated by numerous headers having no associated data.

Other existing schemes force a user to scroll or tab through various data fields or pages to find or display relevant information. For example, where an individual data field includes or supports multiple data elements, typically, a single element is displayed in association with a data label associated with the data field. Therefore, the user is forced to manually scroll through a list of the remaining data elements to view or act on other data elements within the data field. Similar schemes provide a pop-up window or similar system for individual data fields or categories that, when activated by a user, open up to display the information associated with that data field. Such pop-up windows typically also include data labels and blank spaces corresponding to missing data and, as described above, such schemes also tend to appear overly cluttered and complicated.

One example of a prior art scheme which forces a user to tab through various pages to find or display relevant information is illustrated in FIG. 2, which shows a "contact card" or property display for single contact in another prior art electronic address book. Specifically, as illustrated by FIG. 2, a "Name" page supports data elements including first and last name, display name, e-mail address, nickname, and data fields for work, home, fax, pager, and cellular phone numbers. Other pages, including "Contact," "Notes," and "Conferencing" pages, supporting other data fields, are displayed by user selection of the tabs representing those pages. Consequently, where the user wants to view or enter information supported by these other pages, he must manually switch between them. Further, in such schemes, headers for specific elements of information are provided to facilitate and organize user entry of the corresponding data, whether or not that information is available. However, as discussed above, users often fail to populate the information associated with contacts in address book, because it can be time consuming, because it is not important, or because they simply do not have the information available to complete each of the myriad fields. Consequently, as clearly illustrated by FIG. 2, such pages may be substantially blank, yet still appear overly complicated by numerous headers having no associated data.

Therefore, what is needed is a system and method for dynamically displaying a summary of available information, without including data labels or information headers for information that is not available, in order to minimize wasted space. Further, because some information is not important to a user, or some information is less important than other information, the system and method for dynamically displaying a summary of available information should also arrange or display specific elements of the information in accordance with a level of importance associated with that information.

SUMMARY

The present invention is embodied in a new system and process for dynamically displaying data objects or "information" on a computer display device based on a predefined priority associated with each individual element of the information. Consequently, more important information, i.e. information having a higher priority, is displayed prior to less important information. The information may be either entered by a user via a user interface, or automatically retrieved from one or more electronic data sources. For example, a large amount of different information is typically entered either automatically or by a user to fully describe a subject, such as, for example, a personal contact in an electronic address book. Frequently, however, not all of the information to describe such a contact is available. One reason for unavailability of data includes users that fail to populate the information for contacts in the address book, because it can be time consuming, because it is not important, or because they simply do not have the information available to complete each of a large number of fields or data objects. Further, the information that is available is often more than can be easily displayed within a single concise window. Consequently, the present invention is used to dynamically arrange and display as much of the information as will fit within the single window based on the predefined priority associated with each portion or element of the information.

In general, the present invention provides a summary window for displaying a subset of available data or information based on a predefined priority associated with individual data elements or categories. Consequently, the display device is automatically and dynamically populated with as many of the data elements as will fit within the display window. Thus, depending upon the amount of data and the size of the window, either all, or a portion of the data is displayed. The arrangement and population of the display is based on the priority of each individual data element such that an existing data element having the highest priority is displayed first, with lower priority data elements being arranged and displayed as space within the window permits. Data elements or categories that do not have any available data or information are simply not displayed. The arrangement or layout of the displayed information automatically and dynamically changes as information having a higher priority than that already displayed becomes available. Further, in additional embodiments, the user specifies or modifies the priority of individual data elements to suit the personal preferences of the user.

In a further embodiment, where the size of the display window is increased, either by the user or automatically, the display will be dynamically adjusted and more information will be displayed within the display window, again based on the priority of each individual data element. Similarly, where the size of the display window is decreased, the display will be dynamically adjusted and less information will be displayed within the display window, again based on the priority of each individual data element.

All information is displayed, space permitting, based on a predefined priority as described above. However, if the specific information, such as, for example a data field for a contact work address, has not been completed, or does not exist, that information, and any associated data label, will not appear in the summary window.

In one embodiment, at least one column is used to display data in the summary window. Where more than one column is used for displaying data, the data flows from one column to the next, using conventional techniques, until all the space in each column has been used. As described above, fields or data elements that do not have any available data or information are simply not displayed. Using the priority associated with each data object or data element, the data is displayed in the order of most important information to least important information; with less important information or data not displaying at all where there is insufficient space to display that data.

In addition, when displaying information using one of many foreign languages, such as, for example, information comprised of Japanese or Chinese characters, a substantially smaller area is typically required to display information than that needed to display information using other languages and alphabet characters, such as for example, English or Russian. Further, certain data elements, in any language or alphabetic character set, may require either more or less space to display that information than does other data elements. Consequently, in one embodiment of the present invention, dynamically populating the display includes the capability to adjust the area allocated for the display of individual data elements by determining the minimum amount of space required to fully display specific data elements. One example of implementing this capability is to automatically resize display columns to fit the data displayed within each column. Consequently, more columns, and thus more data, may be displayed within a single window. Clearly, this capability serves to maximize the ability to display information within a given display window.

In another embodiment of the present invention, one or more of the individual data elements displayed within the display window are user selectable and editable. Upon user selection and edit of individual data elements, the display is automatically and dynamically adjusted to show any changes, deletions, or additions to the data element.

Further, in another embodiment, action buttons are associated with one or more of the individual data elements displayed within the display window. These action buttons are tailored to perform specific actions relative to the specific type of data represented. For example, if the displayed data represents an address, the action button may automatically provide directions to the location represented by the address. In another example, if the displayed data represents a telephone number, the action button may automatically dial the telephone number, or zoom into or otherwise enlarge the portion of the display representing the telephone number so that a user may better view the number in order to dial that number manually. Similarly, if the information represents an email address, the action button may automatically address an email to that address, or provide other statistics representing that address. Further, where the displayed information represents personal information, such as a birthday, the action button may automatically link to a calendar or schedule program for scheduling events associated with that birthday. Clearly, any action appropriate to the displayed information can be associated with an action button tied to that information.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

FIG. 1 is a prior art screen image of a "Summary" page showing a contact for a prior art electronic address book.

FIG. 2 is a prior art screen image of a "Contact Card" showing a contact for a prior art electronic address book.

FIG. 3 is a diagram depicting a general-purpose computing device constituting an exemplary system for implementing the present invention.

DETAILED DESCRIPTION OF THE PREFERRED EMBODIMENTS

Figure 4:
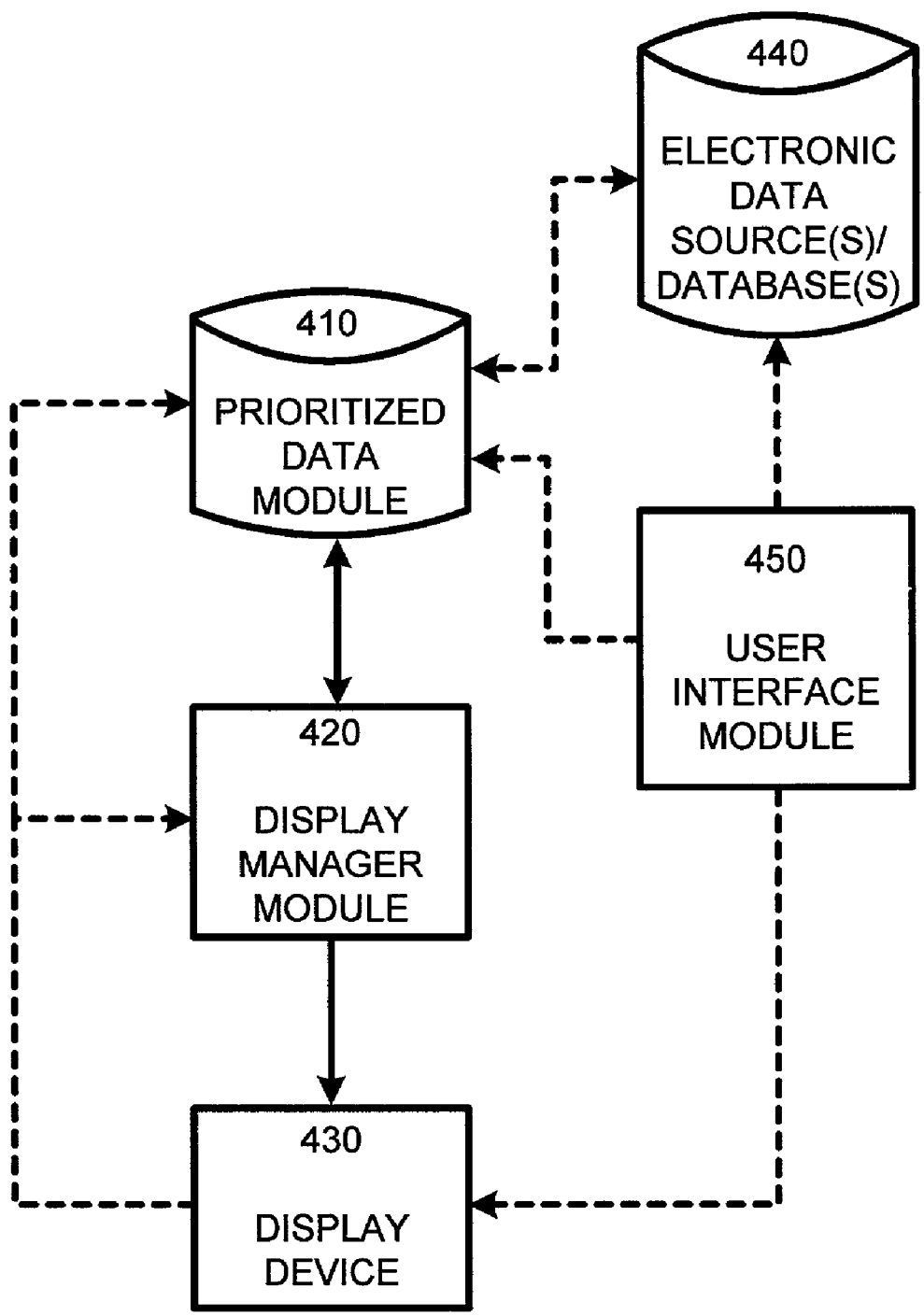
FIG. 4 is a system diagram that depicts exemplary program modules employed in a system for dynamically displaying prioritized data objects in accordance with the present invention.

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Exemplary Operating Environment

FIG. 3 illustrates an example of a suitable computing system environment 300 on which the invention may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 3, an exemplary system for implementing the invention includes a general purpose computing device in the form of a computer 310.

Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

The exemplary operating environment having now been discussed, the remaining part of this description will be devoted to a discussion of the program modules and processes embodying the present invention. The program modules associated with dynamically displaying prioritized data objects will be described first in reference to the system diagram of FIG. 4. In addition, the processes for dynamically displaying prioritized data objects will be described with reference to the flow diagram of FIG. 5, and the exemplary user interface of FIG. 6. Finally, a working example will be discussed with reference to the screen image of FIG. 7.

System Overview

FIG. 4 is a general system diagram illustrating program modules used for dynamically displaying data objects or "information" on a computer display device based on a predefined priority associated with each individual element of the information. By way of example, data objects are, in a basic sense, variables for holding information, such as, for example, an email address, phone number, or birthday for a contact in an electronic address book, or any other information that can be categorized and stored in a database or other electronic data source.

In general, a system and process according to the present invention uses the program modules illustrated in FIG. 4 to automatically and dynamically display prioritized data objects, either with or without a header or title describing the data object, by using a prioritized data module 410 to provide prioritized data to a display manager module 420 which in turn dynamically populates a display device 430. The prioritized data module 410 uses conventional techniques to read data objects or information either automatically from one or more electronic data sources or databases 440, or manually via a user interface 450. Alternately, the prioritized data module 410 is itself simply a database containing prioritized data objects. Further, in one embodiment, the user interface 450 uses conventional techniques to allow a user to manipulate data within the electronic data sources or databases 440, such as by editing existing data, entering new data, or deleting existing data. Similarly, in another embodiment, the user interface 450 uses conventional techniques to allow a user to manipulate data directly within the prioritized data module 410, such as by selecting specific data objects and editing, deleting, or adding information represented by the data objects.

The prioritized data module 410 is basically a database of prioritized data objects which operates in one of several ways. For example, in a first embodiment, data objects read by or stored in the prioritized data module 410 are automatically assigned a priority based upon a predefined priority list associated with the data objects or information. Alternately, the priority list is user configurable via the user interface 450 using conventional techniques. In this embodiment, a user may view the priority list, and assign desired priorities to each data object, or change existing priorities, whether predetermined, or previously set by the user. Finally, in a further embodiment, the priority list is dynamic, with the priorities comprising the list being automatically and dynamically updated based upon the frequency of use for specific data objects or information elements.

The priority list is preferably tailored for specific sets of data objects. For example, a set or group of data objects may represent information such as prices for food items. Using this example, data objects representing specific food items having a known sales volume are given decreasing priorities in decreasing order of sales volume. Alternately, the food items may be prioritized based on price, with higher priced food items receiving higher priorities. Other examples of prioritization schemes include, for example, prioritization by vendor, by calories per serving, by shelf space requirements, or by shelf life. Clearly, such techniques can be applied to any type of consumer goods, and may use any desired scheme for assigning priorities. Another example of a prioritized data set includes names of workers in a business, with priorities, being based on such things as, for example, years of service, salary, age, productivity, number of sick days used, etc.

Still another example of a prioritized data set includes specific information relevant to one or more contacts in an electronic address book. Examples of such specific information includes items such as, for example, a contact name, an email address, a home, work, fax, pager or cell phone number, a contact home or business address, a contact birthday, or any other information that may associated with a contact in the address book. Each of these specific information items, or data objects, is preferably assigned a priority using one of the above-described methods, i.e. predefined priority list, dynamic priority list, or user specified/modified priority list. For example, priorities for specific data object types may simply be predefined based on a presumed order of importance for each data object type. Consequently, a contact email address may be given the highest priority, followed in decreasing order of priority by a contact home telephone number, a contact home address, a contact birthday, a contact business phone number, etc. Clearly, any desired order of priority may be associated with such data objects. Alternately, in using a dynamic priority list, priority is based on frequency of use or access by a user. Consequently, in such an embodiment, the prioritized data module 410 simply keeps a count of how often a user makes use of a particular data object type for contacts in the address book, such as, for example, a contact email address or contact home phone number. Using this count, the prioritized data module 410 then automatically assigns increasing priorities to data objects in order of increasing use for those data object types.

Once priorities have been associated with data objects, the data objects are provided to the display manager module 420 by the prioritized data module 410. The display manager module 420 then sorts the data objects in order of priority using any of a number of conventional sorting techniques. However, it should be noted that not all data objects are necessarily populated. For example, using the aforementioned example of an electronic address book, users often fail to populate the information for contacts in address book, because it can be time consuming, because it is not important, or because they simply do not have the information available to complete each of the myriad fields that may be allocated by an application hosting the electronic address book. In one embodiment, the prioritized data module 410 simply does not pass incomplete or unpopulated data objects to the display manager module 420. In another embodiment, the prioritized data module 410 passes all data objects to the display manager module 420, however, the display manager module simply ignores incomplete or unpopulated data objects.

In either embodiment, the display manager module 420 automatically and dynamically populates the display device 430 with as many of the data objects as will fit within a window on the display device. Thus, depending upon the amount of data and the size of the window, either all, or a portion of the data is displayed. The arrangement and population of the display is based on the priority of each individual data object such that an existing data object having the highest priority is displayed first, with lower priority data objects being arranged and displayed as space within the window permits. As discussed above, data objects that do not have any available data or information, i.e. they are unpopulated, are simply not displayed. The display manager module 420 automatically and dynamically changes the arrangement or layout of the displayed information as information having a higher priority than that already displayed becomes available, or as data objects are edited or deleted as described in further detail below.

Operation

The above-described program modules are employed to dynamically display prioritized data objects using the exemplary process that will now be described. This process is depicted in the flow diagram of FIG. 5 which represents an exemplary method for implementing the display manager module 420 of the present invention, as shown in FIG. 4. It should be noted that the boxes and interconnections between boxes that are represented by broken or dashed lines in FIG. 5 represent alternate embodiments of the present invention, and that any or all of these alternate embodiments, as described below, may be used in combination.

Figure 5:
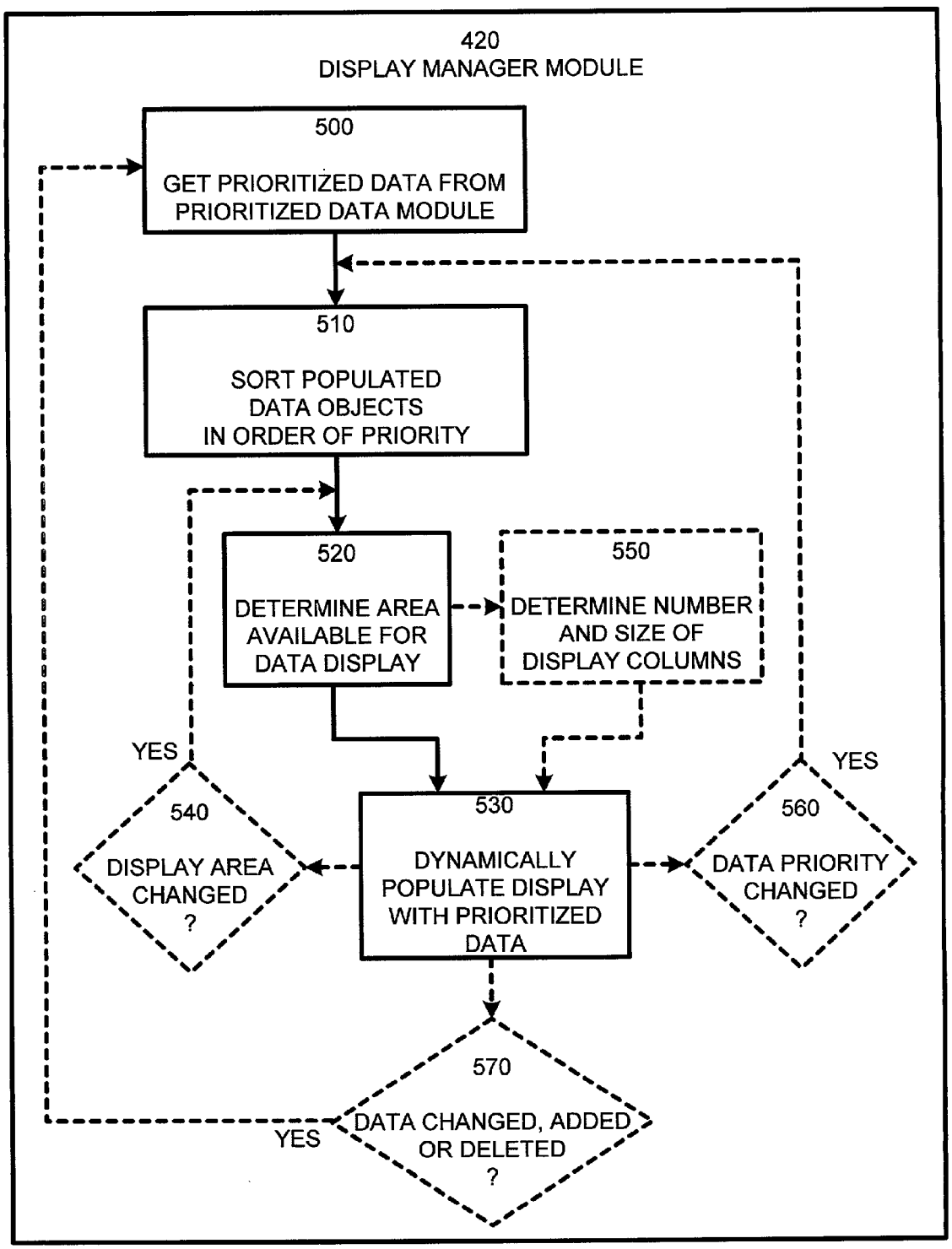
FIG. 5 is an exemplary flow diagram for dynamically displaying prioritized data objects in accordance with the present invention.

Referring now to FIG. 5 in combination with FIG. 4, the process is started by getting prioritized data objects (Box 500) from the prioritized data module 410. As described above, in one embodiment, the prioritized data module 410 simply does not pass incomplete or unpopulated data objects to the display manager module 420. In another embodiment, the prioritized data module 410 passes all data objects to the display manager module 420, however, the display manager module simply ignores incomplete or unpopulated data objects.

Next, as described above, data objects having data, i.e. populated data objects, are sorted in order of priority (Box 510). Once the data objects are sorted, the display manager module 410 determines the area or space available for displaying data (Box 520) on the computer display device 430. This determination is made by using conventional techniques to determine the size of the window to be used for the summary display. Typically, this size is returned in pixels for conventional display devices. Clearly, the window can be any size that can be displayed by the display device 430.

Finally, the display manager module 420 dynamically populates the display device 430 with the sorted prioritized data (Box 530). In general, all information, i.e. the data represented by the prioritized data objects, is displayed, space permitting, based on the predefined priority for each data object as described above. Again, as described above, data objects that do not have any available data or information are simply not displayed. Using the priority associated with each data object, the data is displayed in the order of most important information to least important information; with less important information or data not being displayed at all where there is insufficient space to display that data.

In a further embodiment, the display area available for displaying prioritized data may be changed (Box 540), either automatically, or by the user via the user interface 450 using conventional techniques as described in further detail below. When the size of the display window is changed, the display manager module 410 again determines the area or space available for displaying data (Box 520) on the computer display device 430. As described above, the display manager module 420 then dynamically populates the display with the sorted prioritized data (Box 530). Given the computing power of typical computers, dynamic population of the display is easily completed in real-time as the size or area of the display window changes. In the case where the display area is increased, the display will be dynamically populated, as described above, such that more information will be displayed within the display window, again based on the priority of each individual data object. Similarly, where the size of the display window is decreased, the display will be dynamically populated, as described above, and less information will be displayed within the display window, again based on the priority of each individual data object.

In general, a single column is used to display data in the summary window. However, in an alternate embodiment, at least one column is used for displaying data. The number of columns that may be displayed is automatically determined (Box 550) based on the determination of the area available for displaying prioritized data (Box 520). In this embodiment, the data flows from one column to the next, using conventional techniques, until all the space in each column has been used. Preferably, each of the columns has an equivalent and fixed width. Thus, one method for determining the number of columns is to simply divide the pixel width of the display area by the fixed pixel width of the columns, and then rounding down to the nearest whole number to determine how many columns will fit within the available display area.

Further, in one embodiment, the width of each column is automatically and dynamically scaled to fit the data objects that will be displayed within each column. In this embodiment, columns are simply added to the display until such time as there is not enough horizontal display area available to accommodate another column. For example, when displaying information using one of many foreign languages, such as, for example, information comprised of Japanese or Chinese characters, a substantially smaller area is typically required to display information than that needed to display information using other languages and alphabet characters, such as for example, English or Russian. Further, certain data objects, in any language or alphabetic character set, may require either more or less space to display that information than does other data objects. Consequently, the size of each column is automatically and dynamically adjusted for optimal display of individual data objects by determining the minimum amount of space required to fully display specific data objects in a given column. In other words, this capability provides the ability to automatically and dynamically resize display columns to fit the data displayed within each column. Thus, this capability serves to maximize the ability to display information within a given display window by providing for more columns, and thus more data, to be displayed within a single window.

In a further embodiment, the priority of data objects may be changed (Box 560), either automatically, or via user interaction with the priority list via the user interface 450, as described herein. Regardless of how the priority list is changed, the display manager module 420 simply sorts the prioritized data objects in order of priority (Box 510) as described above. Once the data objects are sorted, the display manager module 420 again determines the area or space available for displaying data (Box 520) on the computer display device 430 as described above. Finally, again as described above, the display manager module 420 dynamically populates the display with the sorted prioritized data (Box 530).

Similarly, in another embodiment, data objects may be changed, added, or deleted (Box 570), either automatically, or via user interaction with the user interface 450, as described herein. Regardless of how the data objects are changed, added, or deleted, the display manager module 420 simply restarts by getting the prioritized data objects (Box 500) from the prioritized data module 410. Next, as described above, the prioritized data objects are sorted in order of priority (Box 510). Once the data objects are sorted, the display manager module 420 again determines the area or space available for displaying data (Box 520) on the computer display device 430 as described above. Finally, again as described above, the display manager module 420 dynamically populates the display with the sorted prioritized data (Box 530).

Additionally, in one embodiment, all of the prioritized data objects are printable, via a conventional printing device selected via the user interface 450, whether or not there is sufficient area on the computer display device 430 to display those data objects. For example, the prioritized data module 410 may contain ten data objects, with only five of the data objects being used to dynamically populate the display device 430 due to display area constraints as described above. However, in a printed version of the data objects, all ten of the data objects are printed, in order of priority, in the same manner as described above for displaying the data objects on the computer display device 430.

Exemplary User Interface

Figure 6:
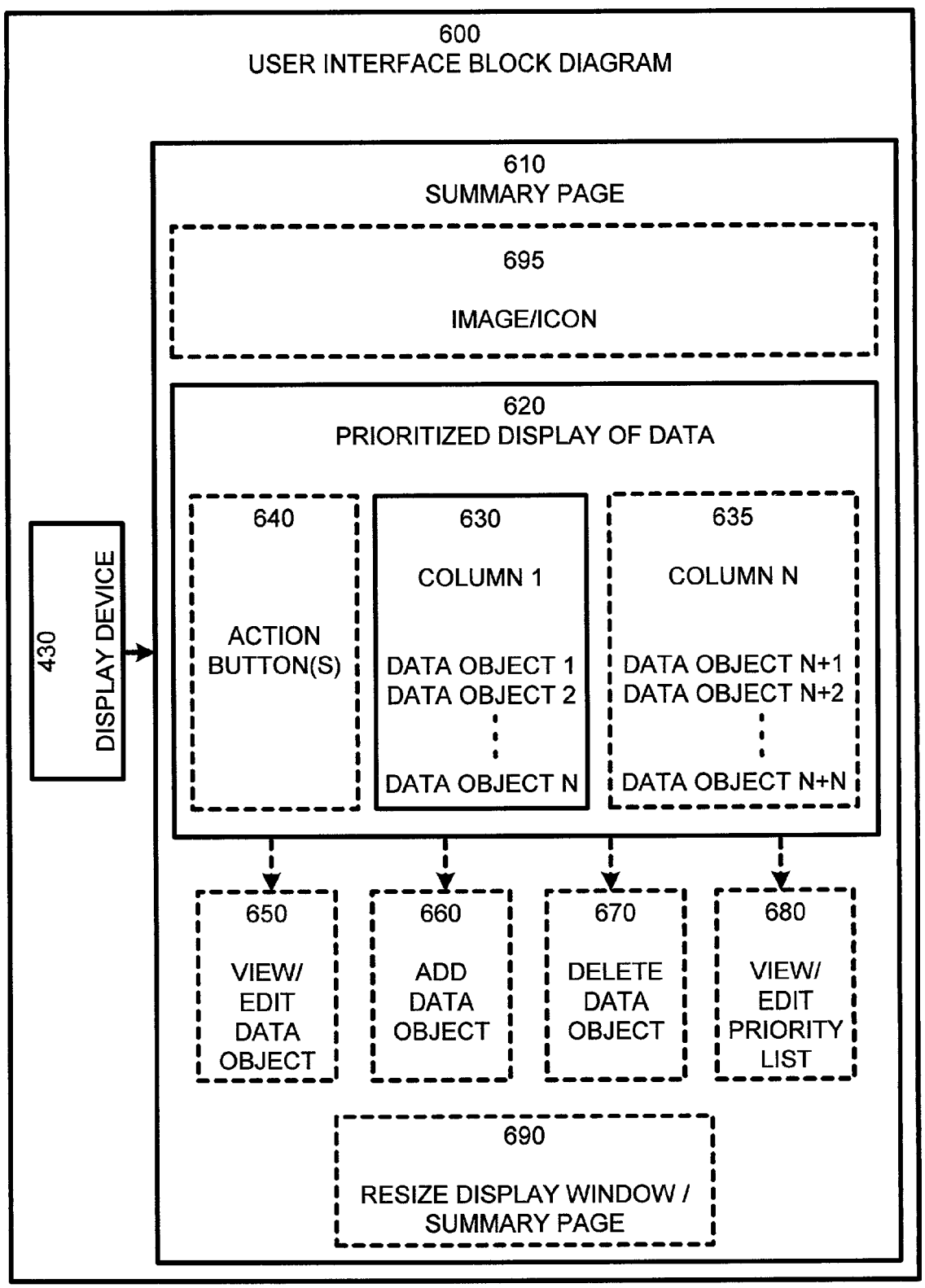
FIG. 6 is an exemplary block diagram of a user interface for interacting with dynamically displayed prioritized data objects in accordance with the present invention.

The block diagram of FIG. 6 illustrates an exemplary user interface that may be implemented with a system and method in accordance with the present invention. The user interface 600 allows for user interaction with a summary page 610 dynamically populated in accordance with the present invention.

Specifically, as illustrated by FIG. 6, the user interface 600 is implemented on a computer display device 430 using conventional techniques. The user interface 600 includes the summary page 610 which is automatically and dynamically populated, as described above. Further, the summary page includes a prioritized display of data objects 620 in a single column 630, again as described above. In addition, in the alternate embodiment described above utilizing multiple columns, one or more additional columns 635 are also used to display prioritized data.

In a further embodiment, action buttons 640 are associated with one or more of the data objects displayed within the summary page 610. The action buttons 640 are conventional program buttons, and may be represented by any desired shape, size, or icon. The action buttons 640 are preferably conventional buttons selectable via traditional computer pointing devices or keyboard strokes, and are tailored to perform specific actions relative to the specific type of data represented by each data object. For example, if one data object data represents an address, an associated action button may automatically link to a program or database to provide directions to the location represented by the address. In another example, if a specific data object represents a telephone number, the action button associated with that data object can automatically dial the telephone number, using a conventional dialing program and a modem, or simply zoom into or otherwise enlarge the portion of the display representing the telephone number so that a user may better view the number in order to dial that number manually. Similarly, if a specific data object represents an email address, the action button associated with that data object can automatically address an email to that address using a conventional email program or client, or provide other statistics representing that address, such as for example, the number of messages sent to or received from the address, or the time that a message was last sent to or received from that address. Further, where a specific data object represents personal information, such as a birthday, the associated action button associated with that data object may automatically link to a calendar or schedule program for scheduling events associated with that birthday. Clearly, any action appropriate to the information associated with a particular data object can be associated with an action button tied to that information.

Further, In another embodiment of the present invention, one or more of the individual data objects displayed within the display window are user selectable and editable 650 using conventional techniques, such as, for example via an inline or in-place edit capability, via a pop-up window for editing data objects, or the equivalent, which is activated for specific data objects by selecting a particular data object via a computer pointing device, or via a data entry page, or the equivalent that is associated with the summary page. Further, the data objects may also be pointers to data stored in another electronic data source or database, with the data objects being selectable and/or editable from within other computer applications that are automatically initiated by user selection of a particular data object. Regardless of how the data objects are changed, the prioritized display of data 620 is automatically and dynamically updated to reflect these changes in real-time, as described above. Similarly, in another embodiment, the user interface 600 also provides the capability to add 660 or delete 670 data objects, again using conventional techniques such as, for example, the techniques described above. Again, as described above, the prioritized display of data 620 is automatically and dynamically updated to reflect the additions or deletions in real-time, as described above.

As described above, the display window may be resized using conventional techniques via a conventional interface 690 to the display window that represents the summary page 610. Again, as described above, the summary page 610 is automatically and dynamically updated to show either more or less data as the size or area of the summary page is either increased or decreased, respectively. Similarly, in one embodiment described above, the number of columns, i.e. 630 and 635, that are displayed is dynamically updated to provide either more or less columns as the size of the summary page is either increased or decreased, respectively.

Further, in one embodiment, a picture, image or icon 695 representing the data objects displayed on the summary page 610 is also displayed in the summary page. This picture may be chosen by the user, and can be an actual photograph, a caricature, an icon, or any other graphical representation of the data objects that the user desires. Preferably, the picture is always displayed. However, a priority may also be associated with the picture such that it is dynamically displayed like any other data object or piece of information represented by the data objects.

Working Example

In a working example of the present invention, an exemplary system and method for dynamically displaying prioritized data objects is embodied in a summary page for contacts in an electronic address book which is accessible to a user via conventional computer pointing devices and/or a computer keyboard. Entries in an electronic address book typically contain information relative to the contact, i.e. the individual, business, organization, etc., that is represented by a contact card or the like, such as, for example, a name, address, one or more phone numbers, an email address, an Internet web site address, links to the last email message sent to or received from the contact, etc.

Figure 7:
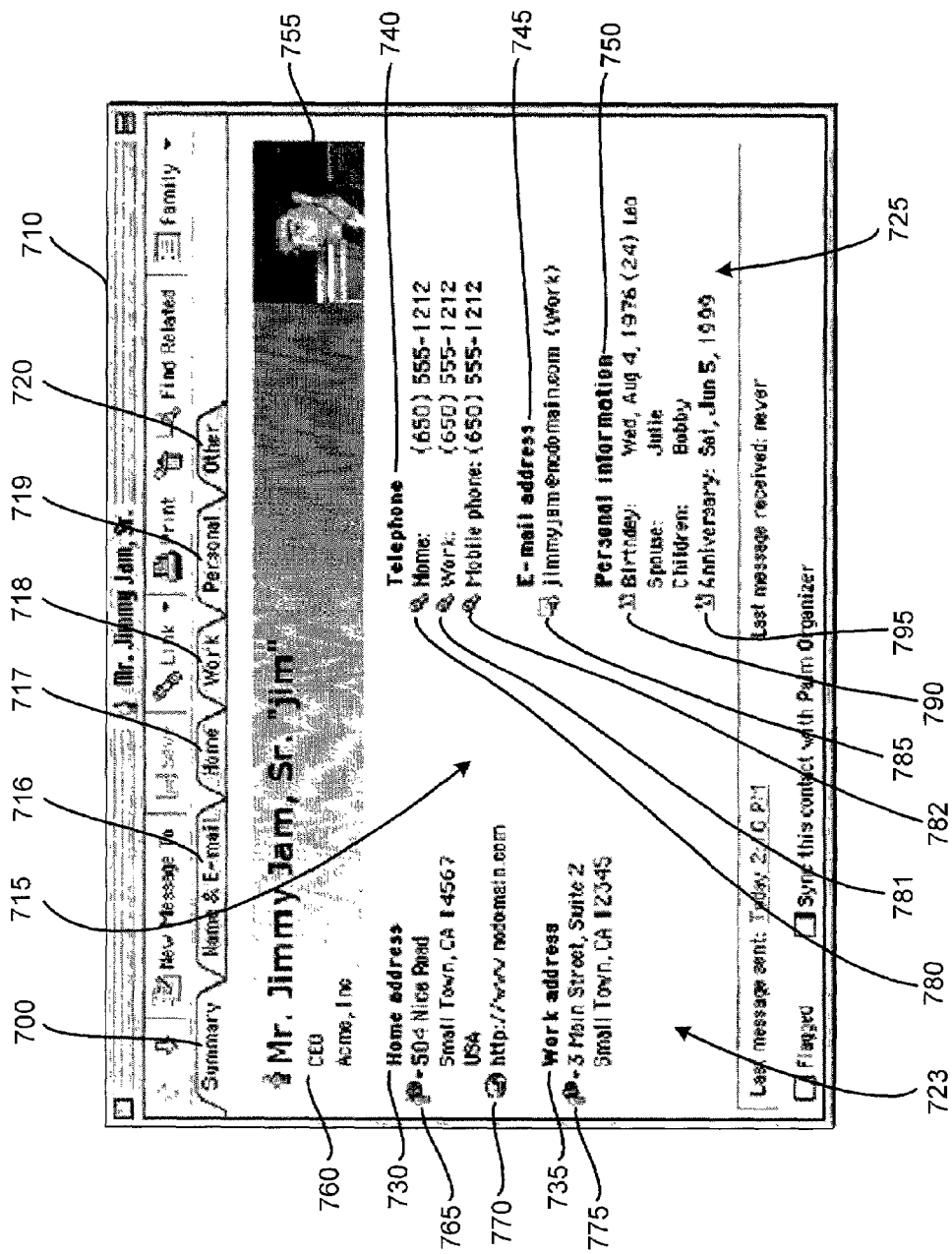
FIG. 7 is a screen image showing an exemplary implementation of a working example according to the present invention.

In general, as illustrated by the screen image shown in FIG. 7, a "Summary" tab 700 is provided for a "contact card" 710 which represents individual entries in the electronic address book. In other words, a set of data objects is used to represent the data associated with each individual contact in the electronic address book. The tab 700 is tied to a summary window 715 that is shown by default when a user opens a contact from the address book. As described above, the summary window 715 provides the user with as much relevant information as will fit in the available space of the summary window. For the purposes of the contact card 710, the information described above, as well as any other relevant information supported by data fields or data objects associated with the contact card are available for display in the summary window 715. In this working example, data entry and edit is preferably completed via data entry pages represented by tabs 716, 717, 718, 719 and 720. Clearly, as described above, data entry can be completed manually in any of a number of ways, and may also be completed automatically by reading data objects from a database or other electronic data source.

It can be seen in FIG. 7 that the summary window 715 is comprised of two columns 723 and 725 for displaying data objects. As described above, data objects are displayed in order of priority. Consequently, from an examination of FIG. 7, it can be seen that the highest priority data object is the "Home address" 730, which in this example, includes both a physical address as well as an Internet home address. The "Home address" data object is followed by a "Work address" data object 735. These two data objects are the highest priority data objects that will fit in the first column 723. Consequently, the remaining data objects are displayed in the second column 725. Specifically, it can be seen from an examination of FIG. 7 that the next highest priority data object is a "Telephone" data object 740 which includes information relative to home, work and mobile phone numbers. Next in priority is an "E-mail address" data object 745 followed by a "Personal information" data object 750 which has the lowest priority of the displayed data objects.

Further, in this embodiment of the working example, a picture representing the contact 755 is also included in the summary window 715. This picture 755 may be chosen by the user, and can be an actual photograph, a caricature, an icon, or any other graphical representation of the contact that the user desires. Preferably, the picture 755 is always displayed. However, as described above, a priority may also be associated with the picture 755 such that it is dynamically displayed like any other data object or piece of information represented by the contact card. In addition, in one embodiment, as illustrated by FIG. 7, this picture 755, may also be associated with identifying information, such as, for example the contact name, nickname, and title 760. Further, it can be seen that the picture and associated text 755 and 760 spans both columns 723 and 725. Consequently, it can be seen that in one embodiment of the present invention, data objects too wide to fit within a single column may automatically span one or more columns as needed.

As described above, each of the data objects represented by the contact card 710 have an associated priority. Consequently, as described above, the display of information in the summary window 715 changes dynamically as data displayed within the summary is changed, or as data or data objects are added to or removed from the set of data objects representing the contact card 710.

Furthermore, as described above, each of the data objects displayed in the summary window 715 has an associated action button. Specifically, in this working example, the "Home address" data object 730 includes an associated action button 765 for automatically providing directions to the address shown by the "Home address" data object. Further, the "Home address" data object 730 also includes an action button 770 for automatically initiating a conventional web browser program to open the Internet web page address shown as a part of the "Home address" data object. Similarly, the "Work address" data object 735 includes an associated action button 775 for automatically providing directions to the address shown by the "Work address" data object. Each of the telephone numbers shown as a part of the "Telephone" data object 740 includes an associated action button 780, 781, and 782 for magnifying the associated phone number to make it easier for a user to view the number when manually dialing that number. Further, the "E-mail address" data object 745 includes an associated action button 785 for automatically initiating a conventional e-mail program and addressing a new e-mail message to the address shown as part of the "E-mail address" data object. Finally, the "Personal information" data object 750 includes associated action buttons 790 and 795 for both a birthday and anniversary. These action buttons, 790 and 795 automatically initiate a typical calendar or scheduling program to schedule events associated with the dates represented by either the date of the birthday, or the date of the anniversary, respectively.

Further, in one embodiment of the working example representing the present invention, each of the contact entries, i.e. each of the data objects, is automatically color coded or shaded when displayed in the summary window based on a user-designated category, such as, for example, family, co-worker, business contact, organization, etc. For example, family members represented by a summary window for a contact card may be represented in red, while coworkers are represented in blue. Clearly, any number of categories may be used, with each category associated with any desired color or shading scheme. Further, where a display device is incapable of displaying information in color, different styles or amounts of shading are used in place of color to represent the different categories of contacts.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatically displaying entry associated information fields, on a computer display device comprising:

for each entry, automatically associating a priority with each entry associated information field in a set of entry associated information fields wherein the priorities of the entry associated fields are user adjustable;

dynamically populating the display device by automatically arranging a position of at least one entry associated information field within a visible display area of the display device beginning with an entry associated information field having a highest priority;

wherein the automatically arranged position of entry associated information fields within the visible display area is not predefined; and continuing to dynamically populate the display device by continuing to automatically arrange a position of one or more of the entry associated information fields having a next highest priority until available space within the visible display area of the display device has been filled with entry associated information fields.

2. The method of claim 1 wherein the priority associated with each entry associated information field is based on a pre-designated priority list.

3. The method of claim 1 wherein the priority associated with each entry associated information field is changeable.

4. The method of claim 3 wherein the dynamic population of the display device is automatically and dynamically updated when a priority associated, with an entry associated information field is changed.

5. The method of claim 3 wherein the priority associated with each entry associated information field is configured via a user interface.

6. The method of claim 3 wherein the priority associated with each entry associated information field is automatically determined based upon a frequency of use for each entry associated information field.

7. The method of claim 1 wherein the dynamic population of the display device further comprises not displaying entry associated information fields that do not contain data.

8. The method of claim 1 wherein data comprising each entry associated information field is changeable.

9. The method of claim 8 wherein the dynamic population of the display device is automatically and dynamically updated when the data comprising an entry associated information field is changed.

10. The method of claim 8 wherein the entry associated information fields are editable via a user interface.

11. The method of claim 8 wherein the entry associated information fields are added via a user interface.

12. The method of claim 8 wherein the entry associated information fields are deleted via a user interface.

13. The method of claim 1 wherein the entry associated information fields are stored in at least one electronic database.

14. The method of claim 1 wherein the available space on the computer display device is adjustable.

15. The method of claim 14 wherein the dynamic population of the display device is automatically and dynamically updated when the available space on the computer display device is adjusted.

16. The method of claim 14 wherein the available space on the computer display device is adjusted automatically.

17. The method of claim 14 wherein the available space on the computer display device is adjusted via a user interface.

18. The method of claim 1 wherein the dynamic population of the display device further comprises automatically arranging the position of displayed entry associated information fields in a single column.

19. The method of claim 1 wherein the dynamic population of the display device further comprises automatically arranging the position of displayed entry associated information fields in at least one column.

20. The method of claim 19 wherein a number of columns for displaying entry associated information fields is determined by automatically computing the number of columns that will fit within the available space on the computer display device.

21. The method of claim 20 wherein the width of each column is fixed.

22. The method of claim 20 wherein the width of each column is automatically determined by computing the minimum width required for displaying prioritized entry associated information fields in each column.

23. The method of claim 1 wherein each displayed entry associated information field have an associated action button selectable via a user interface for performing specific actions relative to each displayed entry associated information field.

24. The method of claim 1 wherein a picture representing the displayed entry associated information fields is displayed on the computer display device.

25. The method of claim 24 wherein the picture is chosen via a user interface.

26. The method of claim 24 wherein the picture has an associated priority, and wherein the picture is displayed only when available space exists on the computer display device after displaying all higher priority entry associated information fields.

27. A computer-implemented process for automatically displaying contact information for contacts in an electronic address book, comprising:

for each entry, selecting a contact in the electronic address book via a user interface, said contact including at least one element of contact information, and wherein each contact element includes an associated priority;

providing a display area within a computer display device for displaying one or more elements of the contact information, and wherein a layout of displayed elements of the contact information within the display area is not predefined and priorities of the elements of the contact information are user adjustable;

automatically determining and arranging a position of at least one of the elements of the contact information within the display area for dynamically generating a priority-based layout of contact elements within the display area, using individual elements of the contact information in order of higher priority to lower priority, with lower priority elements of the contact information being displayed only when available space exists within the display area.

28. The computer-implemented process of claim 27 wherein the priority associated with each individual element of the contact information is automatically assigned to each element.

29. The computer-implemented process of claim 27 wherein the priority associated with each individual element of the contact information is manually assigned to each element via the user interface.

30. The computer-implemented process of claim 28 wherein the priority associated with each individual element of the contact information is editable via the user interface.

31. The computer-implemented process of claim 27 wherein individual elements of the contact information are not dynamically displayed regardless of priority if the individual elements of the contact information are not populated.

32. The computer-implemented process of claim 27 further comprising automatically populating at least one of the individual elements of the contact information from data in an electronic database.

33. The computer-implemented process of claim 27 further comprising manually populating at least one of the individual elements of the contact information via the user interface.

34. The computer-implemented process of claim 27 further comprising editing at least one of the individual elements of the contact information via the user interface.

35. The computer-implemented process of claim 27 further comprising dynamically updating the priority-based layout of the individual elements of the contact information when any of the individual elements of the contact information is changed.

36. The computer-implemented process of claim 27 further comprising dynamically updating the priority-based layout of the individual elements of the contact information when any of the priorities associated with any of the individual elements of the contact information is changed.

37. The computer-implemented process of claim 27 further comprising adjusting the available space of the display area on the computer display device.

38. The computer-implemented process of claim 37 further comprising dynamically updating the priority-based layout of the individual elements of the contact information when the available space of the display area on the computer display device is adjusted.

39. The computer-implemented process of claim 27 wherein the individual elements of the contact information are automatically arranged in at least one column on the computer display device.

40. The computer-implemented process of claim 39 wherein the number of columns on the computer display device is automatically determined based on a width of the available space of the display area on the computer display device.

41. The computer-implemented process of claim 39 wherein a width of each column is automatically determined based on a minimum width of the individual elements of the contact information that are automatically arranged in each column.

42. The computer-implemented process of claim 27 further comprising:
associating at least one action button with each individual element of the contact information;
wherein each action button is selectable via the user interface; and
wherein each action button automatically initiates a predetermined computer-implemented process relative to the individual element of the contact information associated with each action button.

43. The computer-implemented process of claim 27 further comprising automatically displaying an image for representing the contact in the electronic address book selected via the user interface.

44. The computer-implemented process of claim 43 wherein the image has an associated priority, and wherein the image is only displayed if sufficient available space exists on the display area of the computer display device after displaying all higher priority individual elements of the contact information.

45. A computer-readable medium having computer executable instructions for dynamically displaying a subset of at least one entry associated information field from a set of entry associated information fields on a computer display device, said computer executable instructions comprising:
for each entry, automatically assigning a priority to each entry associated information field wherein the ixiorities of the entry associated fields are user adjustable;
sorting the entry associated information fields in order of highest priority to lowest priority;
providing a display area within a computer display device for displaying one or more of the entry associated information fields, and wherein a layout of displayed entry associated information fields within the display area is not predefined; and
automatically generating a layout for arranging and displaying as many of the entry associated information fields as will fit within the display area in order of highest priority to lowest priority, and wherein the displayed entry associated information fields comprise the displayed subset of at least one entry associated information field until available space within the visible display area of the display device has been filled with entry associated information fields.

46. The computer-readable medium of claim 45 wherein assigning a priority to each entry associated information field comprises using a predefined priority list to prioritize each entry associated information field.

47. The computer-readable medium of claim 45 wherein assigning a priority to each entry associated information field comprises prioritizing each entry associated information field via a user interface.

48. The computer-readable medium of claim 46 wherein the predefined priority list is editable via a user interface, and wherein the display of entry associated information field is dynamically updated when the predefined priority list is edited.

49. The computer-readable medium of claim 45 wherein the entry associated information fields are editable, and wherein the automatically generated layout of entry associated information fields is dynamically updated when any of the entry associated information fields are edited.

50. The computer-readable medium of claim 45 wherein entry associated information fields are added to the set of entry associated information fields, and wherein the automatically generated layout of entry associated information fields is dynamically updated when entry associated information fields are added to the set of entry associated information fields.

51. The computer-readable medium of claim 45 wherein entry associated information fields are deleted from the set of entry associated information fields, and wherein the automatically generated layout of entry associated information fields is dynamically updated when entry associated information fields are deleted from the set of entry associated information fields.

52. The computer-readable medium of claim 45 wherein the display area on the computer display device is adjustable, and wherein the automatically generated layout of entry associated information fields is dynamically updated when the display area on the computer display device is adjusted.

53. The computer-readable medium of claim 52 wherein entry associated information fields are displayed in at least one column within the display area of the computer display device, and wherein the number of columns is automatically determined based on a width of the display area.

54. The computer-readable medium of claim 53 wherein each column has a variable width that is automatically determined based upon a minimum width necessary to display the entry associated information fields in each column.

55. The computer-readable medium of claim 45 wherein at least one action button is displayed adjacent to each displayed data element, and wherein each action button is capable of initiating computer executable instructions when selected via a user interface.

56. The computer-readable medium of claim 45 wherein the displayed subset of entry associated information fields is automatically color-coded based on a pre-designated category for describing the set of entry associated information fields.

57. The computer-readable medium of claim 45 wherein the displayed subset of entry associated information fields is automatically shaded based on a pre-designated category for describing the set of entry associated information fields.

* * * * *